United States Patent [19]

Colmon et al.

[11] Patent Number: 4,584,236
[45] Date of Patent: Apr. 22, 1986

[54] GLASS PANE HAVING LOW EMISSIVITY, PARTICULAR FOR VEHICLES

[75] Inventors: Daniel Colmon; Bernard Letemps, both of Thourotte; Jean-Pierre Delpeyroux, Le Pecq; Jacques Fremeaux, Bougival, all of France

[73] Assignee: Saint-Gobain Vitrage, Courbevoie, France

[21] Appl. No.: 633,919

[22] Filed: Jul. 24, 1984

[30] Foreign Application Priority Data

Aug. 4, 1983 [FR] France .................. 83 12843

[51] Int. Cl.[4] .................. B32B 7/00; B32B 7/02; B60L 1/02
[52] U.S. Cl. .................. 428/333; 219/203; 219/543; 428/432; 428/702
[58] Field of Search ............ 219/203, 543; 296/84 D, 296/84 M, 84 R, 90, 93, 97 R; 156/102, 104, 105, 106, 107; 428/34, 38, 333, 432, 702

[56] References Cited

U.S. PATENT DOCUMENTS

| | | | |
|---|---|---|---|
| 2,676,117 | 4/1954 | Colbert et al. | 428/432 |
| 2,944,926 | 7/1960 | Gaiser | 156/102 |
| 3,244,547 | 4/1966 | Orr et al. | 428/432 |
| 4,101,705 | 7/1978 | Fischer et al. | |
| 4,190,452 | 2/1980 | Fischer et al. | 156/54 |

FOREIGN PATENT DOCUMENTS 2399331  3/1979  France .................. 428/432

Primary Examiner—William J. Van Balen
Attorney, Agent, or Firm—Oblon, Fisher, Spivak, McClelland & Maier

[57] ABSTRACT

The invention relates to a pane coated with a metal oxide coating, particularly a pane for an automobile window.

The inventive pane bears a coating on its face intended to be disposed on the interior of the vehicle, which coating is comprised of a metal oxide of low emissivity.

Such a pane improves the physiological comfort of the passengers, particularly during cold periods.

18 Claims, 3 Drawing Figures

GLASS PANE HAVING LOW EMISSIVITY, PARTICULAR FOR VEHICLES

BACKGROUND OF THE INVENTION

1. Field of the Invention

The invention relates to a glass pane, particularly for vehicles of conveyance, in particular automobiles, said pane having low emissivity.

2. Description of the Prior Art

A glass pane of this type is disclosed in Fr. Pat. No. 2,399,331 which pane bears a light-transmitting metal oxide coating on its exterior surface, which coating increases the reflectivity of the pane in the infrated (ir) range. This coating has a resistivity less than 50 ohm per square.

It turns out that such a pane coated in this manner on its exterior surface is susceptible to wear, particularly under the action of the windshield wipers when the pane is used an an automobile windshield, and this wear may result in the development of colored iridescence due to decreased thickness of the coating in the regions of water; further this (i.e., "the wear effect"), and the coating itself detracts from rapid disappearance of fogging; and further the energy properties of such a coated pane are detrimentally influenced in the event of rain by the presence of a water film covering the exterior coating, whereby during cold periods the physiological comfort of the passengers of the vehicle on which said pane is installed is adversely affected, since due to the coating, the pane tends to form a wall having a higher temperature than an uncoated pane would have.

SUMMARY OF THE INVENTION

The object of the present invention is to devise a pane which may be employed in particular as a window pane for a vehicle of conveyance, particularly for an automobile, which pane does not have the mentioned disadvantages of known panes.

The inventive pane is such that it remains unchanged when its exterior, more exposed face is subjected to frictional wear from the windshield wiper blades, and fogging on it disappears faster than on known panes; further, its energy characteristics are unchanged in the event of rain, and during cold periods it provides lower energy loss for the passengers of the compartment on which it is mounted, thereby promoting their physiological comfort, while at the same time having a surface temperature on its exterior surface lower than that of the pane proposed in the prior art document Fr. Pat. No. 2,399,331 cilted supra.

This inventive pane is furnished, at least on its interior face, i.e. the face oriented toward the interior of the passenger compartment on which the pane is mounted, with a coating known as a "low emissivity" coating, of the metal oxide layer type, which increases the degree of reflection of ir radiations.

Advantageously, in order to avoid substantial alteration of the visible light transmission and to enable the visible light transmission characteristic to meet standards applied to window panes used on automobiles, the coating is thin, having a maximum thickness on the order of 3000 Å.

Also for the purpose of preserving a substantial degree of visible light transmission, the sheet which supports the coating (which support sheet may be in particular a glass sheet) should have by itself a visible light transmission coefficient of at least 0.80, and preferably on the order of 0.90.

BRIEF DESCRIPTION OF THE DRAWINGS

The invention will now be described in more detail with reference to the attached drawings.

DESCRIPTION OF THE PREFERRED EMBODIMENTS

Figure 1:
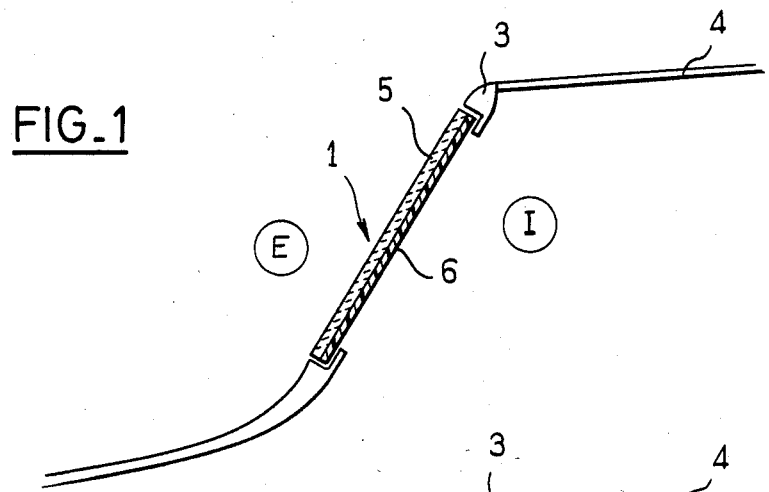
FIG. 1 illustrates an automobile windshield according to the invention.
Figure 2:
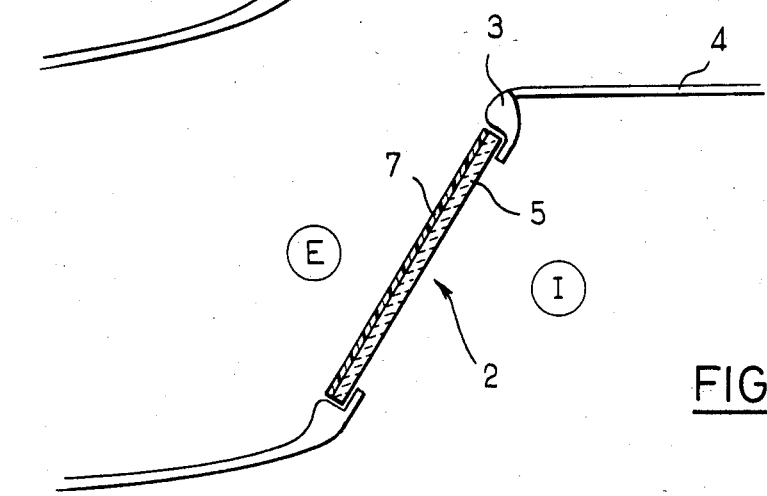
FIG. 2 illustrates a windshield according to the prior art.

According to FIGS. 1 and 2, a pane 1 or 2 is mounted in a frame 3 belonging, e.g., to an automobile body 4. The interior of the vehicle is designated "I" and the exterior "E".

According to FIG. 1, the pane 1 prepared from a sheet 5, which may be in particular a glass sheet, bears on its interior face directed toward the interior of the vehicle a metal oxide coating 6 of low emissivity, which coating increases the degree of reflection of ir radiation from the pane 1.

According to FIG. 2, the pane 2 prepared from an identical sheet 5 bears instead a coating 7 of the same type as the coating of FIG. 1 but applied to the exterior face of the sheet, namely the face directed toward the exterior of the vehicle.

These coatings 6 and 7 are based on oxide(s) of various metals well known in the art. Such metals may be, for example, Fe, Cr, Co, Ti, Al, Sn, Cu, or In.

Such coatings 6 or 7 have beneficial effects on the energy exchange between the exterior and interior of the vehicle. In winder, loss of heat from the passenger compartment of the vehicle is reduced, and in summer the addition of heat from the exterior is also reduced. Further, the improvement over vehicles equipped with untreated panes is accentuated by the fact that the coating 6 or 7 has lower emissivity.

It has been found that when the external temperature is low, on the order of 0° C., and one maintains a constant temperature of 20° C. in the interior of the vehicle, the temperature on the interior face of a pane 1 coated (6) on the interior face (FIG. 1) is on the order of 6° C. while the temperature on the interior face of a pane 2 coated (7) on the exterior face (FIG. 2) is on the order of 14° C.

In view of the fact that the wall temperature is lower in the case illustrated by FIG. 1 than in the case illustrated by FIG. 2, one might expect better physiological comfort as a passenger in the vehicle equipped as shown in FIG. 2, namely in the case where the wall temperature is higher.

However, the opposite turns out to be true. Given an emissivity of 0.4 for both layers 6 and 7, and assuming the passenger radiating in the manner of a black body at about 30° C., said passenger will lose about 9 W/m$^2$ in the case illustrated by FIG. 2 (exterior coating 7), but only about 5 W/m$^2$ in the case illustrated by FIG. 1 (interior coating 6).

Thus there is an advantage to disposing such low-emissivity coatings on the interior side of a passenger compartment, whether such passenger compartment be on a vehicle of conveyance of the automobile type or whether it be another type of passenger compartment, e.g. in a building or vessel.

The advantage of such a pane coated interiorly with a layer having low emissivity is magnified for multi-passenger conveyances of the bus type, wherein the window surface areas are large and the passengers are located in immediate proximity to the window surfaces.

Emissivities on the order of 0.4 are suitable to achieve the effect described. Lower emissivities are even better.

Such coatings 6 disposed facing the interior of the passenger compartment are not subject to wear resulting from accidental scratching, fricational wear from windshield wipers (in the case of panes on vehicles), or weathering. Therefore, they are not subject to the development of colored iridescence which results from decreased thickness of the coating.

Further, such interior coatings, in particular coatings having relatively low emissivity (less than or equal to 0.15), have a resistivity per square of on the order of 16 ohms, maximum, may be supplied with electricity to act as heating layers.

Figure 3:
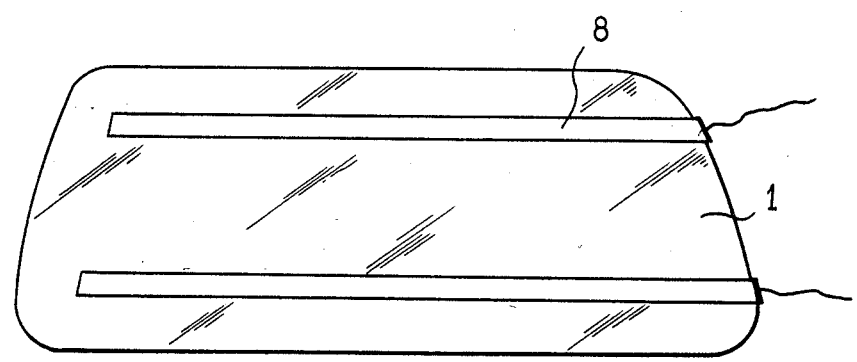
FIG. 3 illustrates a windshield according to the invention, equipped with contact means for supplying electricity.

Preferably, electric power is supplied via contact strips 8 disposed as shown in FIG. 3, namely longitudinally on the pane, whereby the resistance between the strips 8 is relatively low, and is low compared to that pertaining if the strips were disposed in the other direction (i.e., along the short sides of the face of the pane), as is usually done.

Coatings with higher emissivity, on the order of 0.4, may also serve as heating layers provided that a voltage is supplied which is greater than the 12 V supplied by ordinary automobile batteries.

Such a coating 6 disposed interiorly and electrically powered, will not be subject to damage or deterioration, nor to short circuits with the vehicle body due to, e.g., rain.

Such a coating 6 may be produced by pyrolysis of at least one organometallic compound deposited on a glass sheet 5 by spraying it as a powder suspended in a carrier gas, which gas may be, e.g., air.

Means and method for producing such a coating with the aid of a powder are described, e.g. in Fr. Pat. No. 2,427,141, and in Fr. Pat. App. Nos,. 8,304,124 and 8,304,125. According to these prior applications, a powder comprised of an organometallic compound is distributed on a glass substrate by means of a nozzle disposed approximately vertically above the substrate, wherewith the substrate is moved along under the nozzle. Said nozzle is comprised of an opening passing through its entirety, which opening terminates near the substrate in the form of a longitudinal distribution slot, wherewith said opening comprises at least one acceleration zone immediately upstream of the distribution slot, and in form is continuously convergent, formed of two mutually facing walls relatively close to each other which delimit a space in the form of a narrow rectangle (i.e., "a space with its cross section in the form of a narrow rectangle"), wherewith the powder is fed at the entrance to said space, along with an acceleration gas which is also fed at the sides, along the walls of said space, as well as at said upstream entrance. This gas is fed at a high speed and flows toward the distribution slot.

With such a nozzle, a stream of the powder suspended in the gas (which gas is ordinarily air) is formed over the substrate to be coated, said stream being in the shape (of the cross section of said stream) of a narrow rectangle which extends at least over the transverse dimension of the substrate, which substrate is being transported past and underneath the nozzle, said transportion being in the longitudinal direction of the substrate. The stream is maintained in continuous flow toward the substrate, and gas streams are introduced into said stream in order to create turbulence in said stream and to provide well-mixing in the mixture of gas and powder as said mixture progresses toward the substrate, and additional high velocity gas jets introduced on the sides of said stream serve to steadily accelerate the movement of the powder toward the substrate.

Such a nozzle is fed, e.g., in its upper part by tubes delivering a premixture of powder and gas, which tubes have their outlets spaced along the entire longitudinal dimension of the abovementioned narrow rectangle.

In this manner, metallic (i.e., "metal-containing") powders, e.g. tin compounds such as dibutyltin oxide, dibutyltin fluoride (DBTF), various metal acetylacetonates, etc. may be distributed over the substrate.

Thus, e.g., with a DBTF powder deposited on a 4 mm thick glass substrate, one "may obtain by familiar means" a coating of $SnO_2$ doped with fluorine, which coating is 1634–1650 Å thick, with emissivity 0.3 at 393° K. and a visible light transmission coefficient of 0.83.

With the same DBTF powder one may also obtain, e.g. a coating 2400–2450 Å thick, with emissivity 0.25 at 393° K. and a visible light transmission coefficient of 0.76.

Such a coating 6 may also alternatively be produced by spraying organometallic compounds which are in solution, by depositing such compounds in the vapor state, or by vacuum deposition techniques.

The thickness and the nature of the coating may be varied, in particular to meet regulatory requirements for visible light transmissivity, in the case of a pane for an automobile.

In general, in order to meet such requirements the thickness of the coating will be less than 3000 Å.

In order to permit the use of a pane 1 bearing a coating 6 on its face directed toward the interior of the vehicle as an automobile window pane, the sheet 5, which may be in particular a glass sheet, should by itself have a high visible light transmission coefficient, at least equal to 0.80 and preferably on the order of 0.90. The pane 1 after having been coated may then have a visible light transmission coefficient of at least 0.70 or 0.75, so as to meet regulations governing automobile panes.

Accordingly, one may employ, as the sheet 5, a sheet of clear glass known as "Planilux", being 3 or 4 mm thick and having a visible light transmission coefficient of at least 0.90.

Obviously, the beneficial effect of the inventive coatings on the interior face of a panel may be combined with other effects obtained by other treatments carried out on panes.

Thus, the interiorly coated pane may also be exteriorly coated.

Such coatings are not limited to being deposited on the interior face of a pane comprised of a clear glass of the "Planilux" type, but may be deposited on glass which is (internally) tinted and which has a lower energy transmission coefficient.

Thus, glass known as "T.F.A." may be used as a substrate. The term refers to glasses which are internally colored by selenium and oxides of Fe, Co, Ni, and/or Cr, as described in Fr. Pat. Nos. 2,293,328 and 2,330,556, and U.S. Pat. No. 4,190,452.

One may employ glass of the type known as "T.S.A." which, when 4 mm thick, has a visible light transmission coefficient of 0.79 and an energy transmission factor on the order of 0.50. "T.S.A." refers to glasses which are internally colored by oxides of Fe, Co and possibly Se. The amount of Fe oxide being higher than that of "T.F.A." and, on the contrary, the amount of Co oxide and of Se being lower than that of "T.F.A.".

Thus, in the panes the properties due to the coloring of the pane in its internal mass or its exterior coating are added to the supplementary properties due to the interior coating. Accordingly, often such panes if they are doubly coated or have one coating and are also tinted, have insufficient visible light transmissivity to be employed as windshields or lateral or rear windows in automobiles. However, they may find other uses, particularly in houses or as panoramic roofs for automobiles.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pane whic comprises a light transmissive sheet which defines the exterior-interior boundary of a compartment, said sheet having a coating disposed on the face of said sheet directed to the interior of said compartment and said coating having a high light transmission value and low emissivity, said coated pane having an overall transmission value of at least 0.70, and wherein said coating is exposed to the interior of said compartment.

2. The pane of claim 1 wherein the coating comprises at least one member selected from the group consisting of the oxides of Fe, Cr, Co, Ti, al, Sn, Cu, and In.

3. The pane of claim 1 wherein said coating has a thickness of up to 3000 angstroms.

4. The pane of claim 1 wherein said coating has an emissivity of up to 0.40.

5. The pane of claim 1 wherein said sheet has a visible light transmission of at least 0.80.

6. The pane of claim 5 wherein said sheet is a glass sheet.

7. The pane of claim 5 wherein said sheet has a visible light transmission coefficient of about 0.90.

8. The pane of claim 1 wherein said coating comprises tin oxide doped with fluorine.

9. The pane of claim 8 wherein said coating has an emissivity of about 0.3.

10. The pane of claim 9 wherein said coating has a thickness of about 1634 to 1650 Å.

11. The pane of claim 8 wherein said coating has a thickness of about 2400 to 2450 angstroms.

12. The pane of claim 11 wherein said coating has an emissivity of about 0.25.

13. The pane of claim 1 wherein said coating is deposited on said sheet, said sheet being tinted in its internal mass.

14. The pane of claim 1 wherein said coating is supplied with electric power.

15. The pane of claim 14 comprising contact strips for supplying the electric power.

16. The pane of claim 15 wherein said contact strips are disposed in the direction of the longitudinal dimension of the pane.

17. The pane of claim 1 wherein said pane is used in an automobile.

18. The pane of claim 13, wherein said sheet is comprised of glass internally colored by selenium and/or oxides of the group consisting of Fe, Co, Ni, Cr and mixtures thereof.

* * * * *

UNITED STATES PATENT AND TRADEMARK OFFICE
CERTIFICATE OF CORRECTION

PATENT NO. : 4,584,236
DATED : April 22, 1986
INVENTOR(S) : DANIEL COLMON ET AL

It is certified that error appears in the above-identified patent and that said Letters Patent is hereby corrected as shown below:

In the title, delete "particular" and insert --particularly--

In column 1, line 12, delete "2,399,331" and insert --2,399,311--;

In column 1, line 14, delete "infrated" and insert --infrared--;

In column 1, line 37, delete "window panes" and insert --windowpanes--;

In column 1, line 52, delete "cilted" and insert --cited--;

In column 1, line 62, delete "window panes" and insert --windowpanes--;

In column 2, line 38, delete "winder" and insert --winter--;

In column 3, line 12, delete "frications" and insert --frictional--;

In column 3, line 41, delete "method" and insert --methods--;

In column 3, line 42, delete "e.g." and insert --e.g.,--;

In column 3, line 43, delete "App." and insert --Apps.--;

In column 3, line 43, delete "Nos,," and insert --Nos.--;

UNITED STATES PATENT AND TRADEMARK OFFICE
CERTIFICATE OF CORRECTION

PATENT NO. : 4,584,236

DATED : April 22, 1986

INVENTOR(S) : DANIEL COLMON ET AL

It is certified that error appears in the above-identified patent and that said Letters Patent is hereby corrected as shown below:

In column 4, lines 2 and 3, delete "transportion" and insert --transportation--;

In column 5, line 26, delete "whic" and insert --which--;

In column 5, line 37, delete "al" and insert --Al--.

Signed and Sealed this

Seventh Day of October, 1986

[SEAL]

*Attest:*

DONALD J. QUIGG

*Attesting Officer*    *Commissioner of Patents and Trademarks*